(12) United States Patent
Hunsinger et al.

(10) Patent No.: US 8,048,392 B2
(45) Date of Patent: Nov. 1, 2011

(54) METHOD FOR THE CLEANING OF OFF-GAS

(75) Inventors: Hans Hunsinger, Weingarten (DE);
Martin Karlssson, Gothenburg (SE);
Sven Andersson, Hisings Backa (SE);
Ulf Hägg, Mölnlycke (SE)

(73) Assignees: Karlsruher Institut für Technologie, Karlsruhe (DE); Göotaverken Miljö AB, Gothenburg (SE)

( * ) Notice: Subject to any disclaimer, the term of this patent is extended or adjusted under 35 U.S.C. 154(b) by 0 days.

(21) Appl. No.: 12/733,314

(22) PCT Filed: Aug. 22, 2008

(86) PCT No.: PCT/EP2008/061013
§ 371 (c)(1),
(2), (4) Date: Jun. 11, 2010

(87) PCT Pub. No.: WO2009/024612
PCT Pub. Date: Feb. 26, 2009

(65) Prior Publication Data
US 2010/0296993 A1    Nov. 25, 2010

(30) Foreign Application Priority Data
Aug. 23, 2007  (DE) .......................... 10 2007 039 926

(51) Int. Cl.
| | |
|---|---|
| B01D 53/34 | (2006.01) |
| B01D 53/50 | (2006.01) |
| B01D 53/64 | (2006.01) |
| B01D 53/68 | (2006.01) |
| B01D 53/74 | (2006.01) |
| B01D 53/78 | (2006.01) |
| B01D 37/00 | (2006.01) |

(52) U.S. Cl. ................. 423/210; 423/215.5; 423/240 R; 423/243.01; 423/243.06; 422/168; 422/169; 422/172

(58) Field of Classification Search ............... 423/215.5, 423/240 R, 210, 243.01, 243.06; 422/168, 422/169, 172
See application file for complete search history.

(56) References Cited

U.S. PATENT DOCUMENTS

| | | | |
|---|---|---|---|
| 3,760,061 A | | 9/1973 | Hammond |
| 5,330,733 A | * | 7/1994 | Baroni et al. ................ 423/235 |
| 5,753,012 A | * | 5/1998 | Firnhaber et al. ................ 95/65 |
| 7,776,299 B2 | * | 8/2010 | Schoubye et al. ......... 423/242.1 |
| 2007/0154374 A1 | * | 7/2007 | Johnson et al. ............... 423/210 |

FOREIGN PATENT DOCUMENTS

| | | |
|---|---|---|
| DE | 35 07 718 | 11/1988 |
| DE | 37 33 319 | 4/1989 |

(Continued)

*Primary Examiner* — Timothy Vanoy
(74) *Attorney, Agent, or Firm* — Lucas & Mercanti, LLP; Klaus P. Stoffel

(57) ABSTRACT

The present invention relates to a method for cleaning off-gas comprising the following steps:
1. Sulphur dioxide is separated from the off-gas by way of at least one first scrubber stage (c) by means of ammonia or ammonium compounds,
2. the off-gas is transferred into a second scrubber stage (d) and
3. in the second scrubber stage the sulphur dioxide not separated in the first scrubber stage (c), is oxidized to sulphuric acid and separated in at least one scrubber (d) and simultaneously, the ammonia released in the first scrubber stage (d) is separated by means of the formed sulphuric acid, whereby ammonium sulphate is formed,
4. the separated stream of the second scrubber stage (d) is transferred into the first scrubber stage (c).

15 Claims, 2 Drawing Sheets

FOREIGN PATENT DOCUMENTS

| | | |
|---|---|---|
| DE | 37 33 319 | 9/1989 |
| DE | 197 31 062 | 7/2001 |
| DE | 40 36 899 | 10/2001 |
| DE | 102005041794 | 3/2007 |
| EP | 0 212 523 | 3/1987 |
| EP | 0 532 841 | 3/1993 |
| EP | 0 778 067 A1 | 6/1997 |
| EP | 0 778 067 B1 | 8/2001 |
| WO | 00/13770 | 3/2000 |
| WO | 02/062453 | 8/2002 |

\* cited by examiner

METHOD FOR THE CLEANING OF OFF-GAS

BACKGROUND OF THE INVENTION

This application claims priority to DE 10 2007 039 926.1 filed on Aug. 23, 2007. The entire disclosure of the prior application/applications is considered to be part of the disclosure of the instant application and is hereby incorporated by reference.

The present invention concerns a method and a device for the cleaning of flue gases, in particular for the separation of sulphur dioxide ($SO_2$) from flue gas and at the same time prevention of the releasing of ammonia ($NH_3$) and the formation of aerosols at ammonium sulphate resulting therefrom.

From the prior art several methods for the cleaning of waste gases are known. For example a process for the removal of sulphur dioxide from flue gases is described in DE 37 33 319 C2. It concerns a three-stage counter current scrubber process for the separation of sulphur dioxide, in which after a dust-filter and a quench scrubber step for the separation of hydrochloric acid and hydrofluoric acid by means of washing with water the three-stage counter current device is set out. The first two steps of the sulphur dioxide scrubber process are operated by the addition of ammonia, in the third step sulphuric acid is added in order to separate released ammonia.

From DE 197 31 062 C2 a method for the separation of acidic gases from smoke gases is known, in particular from off-gases of power stations and off-gases of waste incinerators. A two-stage counter current scrubber process for the separation of sulphur dioxide is described. A dust filter and a quench/scrubber step are preset to the separation of sulphur dioxide for the removal of hydrochloric acid and hydrofluoric acid by washing with water. In the scrubber cycle of the first stage, ammonium sulfite/hydrogen sulfite is oxidised to ammonium sulphate with oxygen-containing gas.

EP 0 778 067 B1 discloses a device for the cleaning of smoke gases with different amounts of acidic components and methods for the operation of the device. After a dust filter and a quench/scrubber step for the separation of hydrochloric acid and hydrofluoric acid by washing with water a counter current scrubber process for the separation of sulphur dioxide is arranged.

EP 0 212 523 discloses a one-stage counter current scrubber process with the addition of ammonia and oxidation to sulphate by means of addition of air in the scrubber bottom.

The determination of $SO_2$-concentration in off-gases by means of absorption in an aqueous solution of hydrogen peroxide ($H_2O_2$) is described in the VDI Rule 2462, journal 2.

DE 40 36 899 C2 and U.S. Pat. No. 3,760,061 disclose a cleaning process of flue gas for the separation of $SO_2$ by means of hydrogen peroxide whereby sulphuric acid is formed.

With the previously known scrubber methods exclusively by means of ammonia, the separation of sulphur dioxide succeeds only incompletely because low pH-values have to be used in order to prevent the release of ammonia. By means of the addition of sulphuric acid in a third scrubber stage (DE 37 33 319 C2), the ammonia released from the two preset ammonia scrubber stages can be separated. However, in the case of such acid scrubber solutions, nearly no separation of $SO_2$ takes place. In addition to the costs for the necessary sulphuric acid, in particular the additional costs for cleaning and for disposal of the ammonia charge generated by means of the feeding of sulphuric acid, are disadvantageous. These economical facts are important in particular when using this method in waste incinerators.

SUMMARY OF THE INVENTION

The object of the present invention therefore is to provide a method for the efficient separation of sulphur dioxide from off-gases and at the same time avoiding the release of ammonia and the formation of aerosol of ammonium sulphate resulting therefrom. This problem is solved by a process comprising the following steps:

1. Sulphur dioxide is separated from off-gas in a first scrubber stage by means of ammonia or ammonium compounds,
2. the off-gas is transferred into a second scrubber stage,
3. in the second scrubber stage the sulphur dioxide, which has not been separated in the first scrubber stage, is oxidised by addition of an oxidizing agent, for example hydrogen peroxide to sulphuric acid and separated
4. the ammonia released from the first scrubber stage is separated in the second scrubber stage together with the formed sulphuric acid via formation of ammonium sulphate.

The method according to the invention therefore consists of a two-stage scrubber combination, a part of the sulphur dioxide being separated by ammonia in the first scrubber stage and in the second stage the sulphur dioxide, which has not been separated in the first scrubber stage, being separated by means of an oxidizing agent, in particular hydrogen peroxide being used as oxidizing agent. The addition of an oxidizing agent, preferably hydrogen peroxide, is done at least in an stoichiometric amount in view of the $SO_2$-charge entering the second scrubber stage. Particularly preferred is a slightly increased amount of oxidizing agent in view of the charge of sulphur dioxide entering the second scrubber-stage. Both scrubber stages may be provided with one or more wet scrubber cycles. The wet scrubber cycles within a scrubber stage may each have an own or a common bottom.

The scrubber solutions (washing water discharge) of the respective scrubber stages can be led counter-currently to the off-gas. Preferably the sulphuric acid/ammonium sulphate-solution mixture formed in the second scrubber-stage and the excess of hydrogen peroxide present therein is fed back into the preset first scrubber-stage.

In the first scrubber-stage according to the invention ammonia is added, preferably in form of an aqueous ammonia solution. Alternatively to ammonia, also other ammonium compounds such as ammonium carbonate are usable as well. During the separation of $SO_2$ in the scrubber-solution, the pH-value decreases in the scrubber solution. By means of a controlled addition of ammonia or the aqueous ammonia-solution, the pH-value is kept in a variable manner in a control-range of 4 to 6. Under these conditions, the sulphur dioxide in the off-gas is separated in a high proportion. The typical separation rates for sulphur dioxide in one scrubber stage are at about 30 to 90% at pH-values of about 4 to 6. With lower pH-values, the separation grade of $SO_2$ decreases and increases with a higher pH-value. Ammonia behaves the other way round. With a dropping of the pH-value the release of $NH_3$ decreases and with an increase of the pH-value the released amount of ammonia increases.

In the first step a considerable oxidation of the primarily formed ammonium sulfite takes place by the oxygen being present in the smoke gas. The effect of oxidation with oxygen can be maximised by intensive contact between smoke gas and scrubber fluid (large area of exchange of substances, high ratio of scrubber solution to off-gas). The dispersion of $O_2$-containing smoke gas or air in the wet scrubber cycle can contribute to a further increase of the oxidation degree. In detail, the products are formed after the following reactions:

$$2NH_3 + SO_2 + H_2O \rightarrow (NH_4)_2SO_3, \quad (1)$$

$$(NH_4)_2SO_3 + \tfrac{1}{2}O_2 \rightarrow (NH_4)_2SO_4 \quad (2)$$

The ammonium sulfite or -sulphate solution, formed by the reaction, is characterized by a ammonia partial pressure which is dependant from the pH-value and the temperature of the scrubber solution. The partial pressure of ammonia decreases at lower pH-values. It is disadvantageous that the separation of sulphur dioxide decreases likewise with the decrease of the pH-value. At pH-values in the range of 4 to 6, a sufficiently high separation of sulphur dioxide and a moderate release of ammonia are ensured.

For the two-stage process a molar concentration ratio of $SO_2$ to $NH_3$ in the off-gas after the first scrubber stage of 0.5 is preferable, more preferable in the range of 0.5 to 2, in particular preferable in the range of 0.5 to 1. The molar concentration ratio $SO_2/NH_3$ can be controlled via the pH-value in the second scrubber stage. I.e., the desired pH-value in the first scrubber stage is controlled via a cascade control based on the pH-value (difference of pH-value from desired value) of the second scrubber stage. A decreasing pH-value in the second scrubber stage means an excess of $SO_2$ and an increasing pH-value an excess of $NH_3$ in the off-gas before entering the second scrubber stage. The pH-value in the second scrubber stage is concretely set in the range of 1 to 5, preferably in the range of 2 to 4, the pH-value in the second scrubber stage for example is set at about 3. If the pH-value in the second scrubber stage falls below the specified value (for example pH<3) the desired -pH-value in the first scrubber stage is automatically increased via a control loop. As a result the separation degree of $SO_2$ in the first scrubber stage and the release of $NH_3$ is increased. This results in the increasing of the pH-value in the second scrubber-stage. With increasing pH-value (for example pH>3) in the second scrubber-stage, the desired pH-value of the first scrubber-stage is decreased. As a result, the $SO_2$ separation is decreased and the release of $NH_3$ in the first scrubber-stage is reduced. As a consequence, the pH-value in the second scrubber-stage decreases. By this relay of the control loops, the two stage scrubber method can be optimally controlled, i.e. the pH-value in the second scrubber-stage is maintained at about 3 and thus the molar concentration ratio of $SO_2$ to $NH_3$ in the off-gas after the first scrubber-stage is maintained in the desired range of about for example 0.5-1.

The $SO_2$ concentrations in the off-gas of technical processes, for example waste incinerators, can have considerable fluctuations as a result of the heterogeneous fuel compositions. This means that the optimal pH-value of the first scrubber stage cannot be a fixed value. The optimal desired pH-value of the first scrubber stage therefore can vary within a relatively wide range of from about 4 to 6. The regulation to the variable desired pH-value in the first scrubber-stage is done by means of a $NH_3$ dosage into the scrubber-cycle of the first scrubber stage. By the relay of both scrubber-stages and the above mentioned controlling of the pH-value-regulation (control loop cascade) the process can always be managed in the optimal range (minimized $H_2O_2$-consumption) even at varying $SO_2$-concentrations in the off-gas before the first scrubber stage.

After the first scrubber stage, only low amounts of sulphur dioxide and ammonia are left in the off-gas which should be in a molar stoichiometrical ratio of about 0.5 to 1.

The off-gas is then transferred into the second scrubber stage. Dependant on the sulphur dioxide concentration which is measured in the off-gas before entering the second scrubber stage, an oxidizing agent is now added into the second scrubber stage. The $SO_2$ separation is by at least stoichiometrical addition of an oxidizing agent into the scrubber solution to a large extent independent from the pH-value. Preferable is the addition of hydrogen peroxide as oxidizing agent. However also other oxidizing agents such as for example ozone, sodium or potassium peroxide may be considered. The required amount of oxidizing agent, preferably hydrogen peroxide, is used at least in the stoichiometrical ratio to the $SO_2$-charge in the off-gas before entering the second scrubber stage. Alternatively, also the $SO_2$-concentration in the clean gas after the second scrubber stage can be used as controlling parameter for the for the $H_2O_2$-dosage.

A further possibility of a controlled addition of oxidizing agent can also take place by a direct or indirect measurement of the concentration of oxidizing agents in the scrubber cycle of the second scrubber stage.

Preferably the molar ratio of the added amount of hydrogen peroxide in relation to the sulphur dioxide charge in the off-gas before entering the second scrubber stage is in the range of about 1 to 2, preferably about 1 to 1.5, in particular preferably about 1.2 to 1.3. By means of the addition of hydrogen peroxide the sulphur dioxide is practically quantitatively separated under forming of sulphuric acid:

$$SO_2 + H_2O_2 \rightarrow + H_2SO_4 \quad (3)$$

The ammonia still left in the off-gas after the first scrubber stage is also separated in the second scrubber stage. To this purpose serves the sulphur acid resulting from the oxidation.

$$2NH_3 + H_2SO_4 \rightarrow (NH_4)_2SO_4 \quad (4)$$

Since the second scrubber stage is carried out acidly (pH<7) the result is a sulphuric acid ammonium sulphate solution. The preferably slightly overstoichiometrical $H_2O_2$ dosage in the ratio to $SO_2$ has the effect that the scrubber solution of the second scrubber stage may still contain low residual amounts of unspent $H_2O_2$.

The pH-value of the second scrubber stage is preferably between 1 und 5, more preferably between 2 und 4 and especially optimal at about 3. The pH-value of this second scrubber stage is maintained by an appropriate cascade control of the variable desired pH-value of the first scrubber stage.

The mixture of sulphuric acid, ammonium sulphate and the unused oxidizing agent, for example hydrogen peroxide, can preferably be fed back into the first scrubber stage. The sulphuric acid present in relatively low amounts then reacts in the first scrubber stage with the added ammonia to ammonium sulphate. The excess of also back fed hydrogen peroxide preferably oxidises still present ammonium sulfite to ammonium sulphate and thereby supports the oxidation process proceeding with the residual oxygen from the off-gas.

$$(NH_4)_2SO_3 + H_2O_2 \rightarrow (NH_4)_2SO_4 + H_2O \quad (5)$$

By means of the procedure according to the invention the sulphur dioxide is separated practically quantitatively. The sulphuric acid formed in the second scrubber stage nearly completely absorbs the ammonia released in the preset stage. By way of the process according to the invention therefore extremely low clean gas concentrations of $SO_2$ and ammonia can be reached after the second scrubber stage.

Scrubber devices can be the described scrubber stages as empty spray absorption columns and/or scrubbers with scrubber water-impinged installations such as tower packings or sieve plates or nozzle plates, however also as bubble columns. The operation of the individual stages can take place in co-, counter- or cross-current principle. The individual scrubber stages are each provided in a preferable manner with droplet separators such as for example fibre packages, wet electro filters or inertia separators (for example cyclone separators).

The described scrubber stages can be replenished by further cleaning stages. For example crude gas, for example from a waste incinerator, can be cleared from fly ash by use of a respective filter. That means, for example, tissue filters or electro filters can be preset before the two stage $SO_2$-scrubber process so that the gas to be treated is released from fly ash or other dusts.

Furthermore it is preferable to remove for example hydrochloric acid or hydrofluoric acid before entering the described two stage $NH_3/H_2O_2$-scrubber process. So, by nozzling in of water into the hot smoke gas, a cooling down to saturation temperature can be effected. In the case of waste incinerators at the quench process, the typical water vapour saturation temperature is about 60-65° C. In the water quench, for example hydrochloric acid and hydrofluoric acid but also $HgCl_2$ (important in the case of waste incineration) can simultaneously be absorbed at low pH-values of from −1 to 3, preferably of 0 to 2. Under these conditions sulphur dioxide in the formed aqueous hydrochloric acid solution is regularly not separated.

The removal of hydrochloric acid and hydrofluoric acid can be reached for example by way of devices as for example with water-impinged tower packings, sieve bottom columns, but also with bubble columns or spray absorption columns which are each equipped with droplet separators. The wet scrubber conduction of the scrubber process can be carried out as a method of direct current, counter current or cross current.

DETAILED DESCRIPTION OF THE INVENTION

Figure 1:
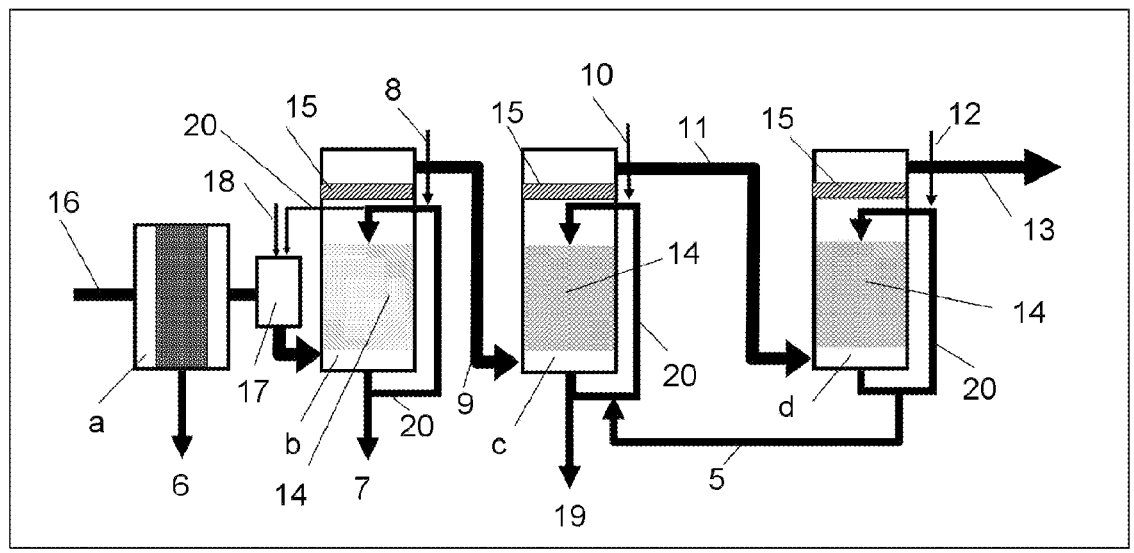
FIG. 1 is a schematic representation of the inventive method.

In the following the invention is described by reference to the example described in FIG. 1 with regard to a device for the cleaning of off-gas.

The crude gas 16 is cleared of fly ash 6 in the filter (a), (for example tissue filter or electro filter). In the quench 17, a cooling down of the off-gas to saturation temperature takes place by nozzling in of water 18. The nozzling in of water 18 for the cooling of smoke gas can also be replaced or supplemented by scrubber water from scrubber stage b. In this case a common scrubber bottom of quench 17 and scrubber stage (b) is preferable. In the quench 17, in addition to the cooling of smoke gas, a partial separation of HCl and hydrofluoric acid and also of $HgCl_2$ takes place.

In the following step (b) a nearly complete separation of hydrochloric acid and hydrofluoric acid is then carried out at pH-values of below 3, preferably 2 to 0. The pH-value can be adjusted by the ratio of separated scrubber water to the entered HCl-charge and/or by controlled addition of a neutralization agent, for example NaOH or $Ca(OH)_2$. Both scrubber solutions of quench and stage (b) can have a common scrubber bottom. In the example according to the invention a droplet separator 15 is used. The device is equipped with a tower packing 14. The scrubber water is led counter currently as cycle 20 to the off-gas through the tower packing 14.

The separated scrubber water 7 (aqueous hydrochloric acid and hydrofluoric acid solution and $HgCl_2$ separated therein) and the vaporized water amount are replaced by fresh water 8 and/or 18 so that practically a constant volume of scrubber water in the water cycle is maintained.

The off-gas is then led via the pipe 9 into the first scrubber stage (c). By controlled addition of an aqueous ammonia solution 10 into the scrubber cycle 20, the variable desired pH-value is adjusted in the range of from 4 to 6. The start-value of the desired pH-value of the first scrubber stage is achieved via a cascade controlling based on the pH-value (pH-value deviation) of the second scrubber stage (d). By the oxidative effect of the residual oxygen in the off-gas and the addition of ammonia, the sulphur dioxide is separated mainly in form of ammonium sulphate and only in small amounts in the form of ammonium sulfite and separated as aqueous solution via the pipe 19. By means of the method of the first scrubber stage regulated on the variable desired pH-value, a molar concentration ratio of sulphur dioxide to ammonia of from >0.5, preferably in the range of 0.5 to 1, is adjusted in the off-gas 11 after the first scrubber stage.

The off-gas is then transferred via the pipe 11 into the second scrubber stage (d). Here an aqueous hydrogen peroxide solution is added via pipe 12 into the water cycle 20. The stoichiometrical ratio of hydrogen peroxide to sulphur dioxide is 1,3 in the example of the invention.

By appropriate control of the desired pH-value in the first scrubber stage (c), the pH-value in the second scrubber stage (d) is maintained at a value of between 2 and 4, preferably at a constant value of about 3. By way of regulation of the start-value of the desired value of the pH-value in the first scrubber stage (c), the separation of sulphur dioxide and the release of $NH_3$ are indirectly controlled. By a gas analysis (not shown) for the determination of the $SO_2$-concentration in the off-gas 11 before entry into the second scrubber stage (d) a controlling of the dosage of the hydrogen peroxide 12 into the second scrubber stage (d) takes place. Hydrogen peroxide is added in an excess (stoichiometry in the range of 1 to 2) preferably 1.3.

The mixture of sulphuric acid and ammonium sulphate generated in the second scrubber stage (d) and unused hydrogen peroxide is fed back via pipe 5 into the first scrubber stage (c). The cleaned off-gas is separated from the second scrubber stage (d) via pipe 13.

Figure 2:
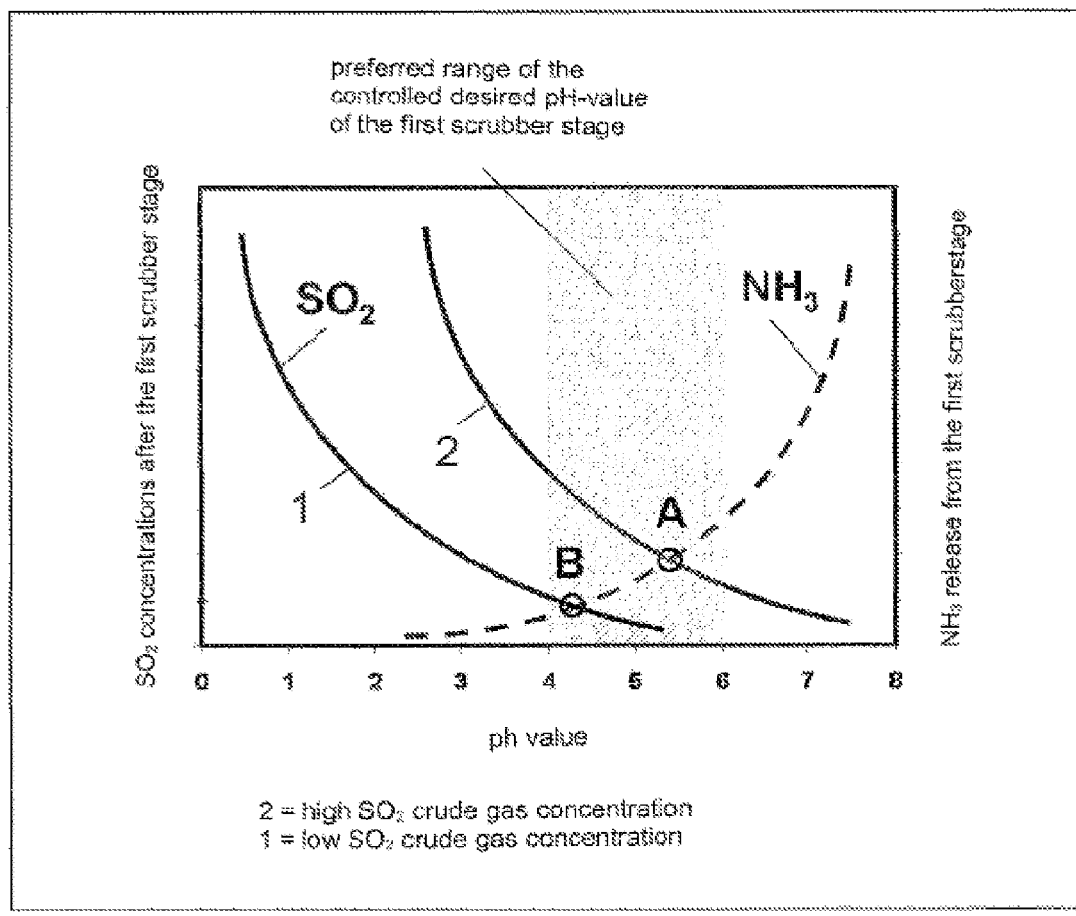
FIG. 2 is a graph plotting $SO_2$ and $NH_3$ concentrations relative to ph value.

FIG. 2 shows schematically the principal dependencies of the $SO_2$— and $NH_3$-concentration in the off-gas from the pH-value after the first scrubber stage (c). The $SO_2$ concentration courses 1 and 2 in the off-gas after the first scrubber stage (c) depend on the pH-value of the first scrubber stage (c) and of the crude gas concentration. Curve 1 shows by way of example the course of the $SO_2$ clean gas concentration at low $SO_2$-crude gas concentration, and curve 2 at high crude gas concentration. The release of $NH_3$ depends essentially on the pH-value of the first scrubber stage. This means that in case of variable $SO_2$-crude gas concentrations the optimal operation point of the pH-value of the first scrubber stage is within the range of from about 4 to 6 in order to maintain a defined molar $SO_2/NH_3$ concentration ratio. Thus follow the qualitatively marked respective optimal operation points A and B. At low $SO_2$-crude gas concentrations therefore a lower pH-value is adjusted than at high $SO_2$-crude gas concentrations. By way of the cascade control based on the pH-value of the second scrubber stage (d) the desired-pH-value in the first scrubber stage (c) is adjusted in the range of 4-6 so that the result is a molar ratio of $SO_2$ and $NH_3$ in the off-gas in the range of 0.5 to 1 after the first scrubber stage (c).

The invention claimed is:

1. A method for cleaning off-gas comprising the following steps:
   1. sulphur dioxide is partly separated from the off-gas in a first scrubber stage (c) by means of ammonia or ammonium compounds,
   2. the off-gas is then transferred into a second scrubber stage (d),
   3. the sulphur dioxide not separated in the first scrubber stage (c) is oxidised to sulphuric acid by means of the addition of hydrogen peroxide into the second scrubber stage (d) and separated whereby the ammonia released from the first scrubber stage (c) is simultaneously separated with the formed sulphuric acid in the second scrubber stage (d),
   wherein the oxidation in the second scrubber stage (d) is carried out by way of the addition of hydrogen peroxide, wherein in the first scrubber stage (c) a variable desired pH-value is adjusted in the range between 4 to 6 by controlled addition of ammonia, and the desired pH-value is adjusted by means of a cascade control based on the pH-value in the second scrubber stage (d), which ranges from 1 to 5.

2. Method according to claim 1, wherein the molar concentration ratio of sulphur dioxide to ammonia in the off-gas is between 0.5 to 2 before entering the second scrubber stage (d).

3. Method according to claim 1, wherein the molar mass flux ratio of the addition of hydrogen peroxide to the sulphur dioxide charge in the off-gas after the first scrubber stage is 1 to 2.

4. Method according to claim 1, wherein the molar mass flux ratio of hydrogen peroxide to the sulphur dioxide charge in the off-gas after the first scrubber stage is of from 1 to 1.5.

5. Method according to claim 1, wherein the molar mass flux ratio of the hydrogen peroxide to the sulphur dioxide in the off-gas after the first scrubber stage is 1.2 to 1.3.

6. Method according the claim 1, wherein the pH-value in the second scrubber stage is between 2 and 4.

7. Method according to claim 1, wherein the pH-value of the second scrubber stage is about 3.

8. Method according to claim 1, wherein a mixture of water, sulphuric acid and ammonium sulphate and excess hydrogen peroxide is separated from the second scrubber stage into the first scrubber stage.

9. Method according to claim 1, wherein a separation of dust (a) is preset to both scrubber stages (c, d).

10. Method according to claim 1, wherein a tissue- or a electrical-filter (a) is used for the separation of dust.

11. Method according to claim 1, wherein after the separation of dust and before the separation of the sulphur dioxide, hydrochloric acid and hydrofluoric acid and $HgCl_2$ are separated.

12. Method according to claim 1, wherein the off-gas is cooled down to saturation temperature during the separation of hydrochloric acid and hydrofluoric acid by water injection.

13. Method according to claim 1, wherein during the HCl-separation the pH-value is adjusted to −1 to 3.

14. Method according to claim 1, wherein during the HCl-separation the pH-range is adjusted between 0 to 2.

15. Device for the realization of a method according to claim 1 comprising
   a) a dust separator (a) for the separation of fly ash (6)
   b) a quenching device 17 and a scrubber device (b) for the separation of hydrochloric acid and hydrofluoric acid with a separation pipe (7)
   c) a first scrubber stage (c) with a feed pipe for ammonia (10) and a separation pipe (19) for an aqueous ammonium sulphate/sulfite solution and with a pipe (11) for the transfer of the off-gas into a second scrubber stage (d), and
   d) a second scrubber stage (d) for the process of an oxidation with a feed pipe (12) for the supply of an aqueous hydrogen-peroxide solution, a separation pipe for the clean gas (13) and a pipe (5) for feeding back of an aqueous solution of sulphuric acid and ammonium sulphate and excess of hydrogen peroxide into the first scrubber stage (c).

* * * * *